United States Patent
Suzuki

(10) Patent No.: US 7,830,423 B2
(45) Date of Patent: Nov. 9, 2010

(54) METHOD AND APPARATUS PROVIDING IMAGER NOISE REDUCTION USING PARALLEL INPUT ARITHMETIC MEAN MODULES

(75) Inventor: Toshiki Suzuki, Tokyo (JP)

(73) Assignee: Aptina Imaging Corporation, Grand Cayman (KY)

( * ) Notice: Subject to any disclaimer, the term of this patent is extended or adjusted under 35 U.S.C. 154(b) by 1080 days.

(21) Appl. No.: 11/193,422

(22) Filed: Aug. 1, 2005

(65) Prior Publication Data

US 2007/0019085 A1    Jan. 25, 2007

(30) Foreign Application Priority Data

Jul. 21, 2005    (JP)    ............................. 2005-211477

(51) Int. Cl.
*H04N 5/217*    (2006.01)
*H04N 9/64*    (2006.01)

(52) U.S. Cl. ..................... 348/241; 348/243; 348/246

(58) Field of Classification Search ................. 348/243, 348/245–247, 251, 252, 254
See application file for complete search history.

(56) References Cited

U.S. PATENT DOCUMENTS

| 5,047,863 | A | 9/1991 | Pape et al. |
| 5,172,249 | A | 12/1992 | Hashimoto |
| 5,969,758 | A | 10/1999 | Sauer et al. |
| 6,128,039 | A | 10/2000 | Chen et al. |
| 6,248,991 | B1 | 6/2001 | Chen et al. |
| 6,320,616 | B1 | 11/2001 | Sauer |
| 6,421,085 | B1 | 7/2002 | Xu |
| 6,538,695 | B1 | 3/2003 | Xiao et al. |
| 6,646,681 | B1 | 11/2003 | Macy et al. |
| 6,717,127 | B2 | 4/2004 | Kimura et al. |
| 6,844,896 | B2 | 1/2005 | Henderson et al. |
| 6,861,634 | B2 | 3/2005 | Rossi |

(Continued)

FOREIGN PATENT DOCUMENTS

EP    1 662 774 A2    5/2006

(Continued)

OTHER PUBLICATIONS

Written Opinion of the International Searching Authority, Jan. 31, 2008.

(Continued)

*Primary Examiner*—Kelly L Jerabek
(74) *Attorney, Agent, or Firm*—Dickstein Shapiro LLP

(57) ABSTRACT

Noise correction values are generated through the calculation of pixel offset values and average pixel output values during a calibration procedure. For each read calibration row, an average pixel output value is determined for a plurality of pixel output values. An offset value for each of the plurality of pixel outputs is generated by finding the difference between each of the plurality of pixel outputs and the calculated average pixel output value. An offset value for an entire row of pixel outputs may also be calculated by finding the average pixel output value for a plurality of optically black pixels in the imager row. The average pixel output value for the optically black pixel values may be refined by discarding pixel values outside a threshold window and substituting the average pixel output value and calculate a new average pixel value.

28 Claims, 11 Drawing Sheets

U.S. PATENT DOCUMENTS

| | | | |
|---|---|---|---|
| 7,046,284 B2 * | 5/2006 | Kozlowski et al. | 348/308 |
| 7,242,820 B2 * | 7/2007 | Nam | 382/312 |
| 7,379,098 B2 * | 5/2008 | Yamamoto et al. | 348/222.1 |
| 2003/0184666 A1 * | 10/2003 | Jo | 348/308 |
| 2004/0105598 A1 | 6/2004 | Kondo et al. | |
| 2005/0007159 A1 | 1/2005 | Kondo et al. | |
| 2005/0013508 A1 | 1/2005 | Kondo et al. | |
| 2005/0018916 A1 | 1/2005 | Kondo | |
| 2005/0052541 A1 | 3/2005 | Kondo | |

FOREIGN PATENT DOCUMENTS

| | | |
|---|---|---|
| GB | 2 149 260 A | 6/1985 |
| JP | 2005-101985 | 4/2005 |
| JP | 2005-167918 | 6/2005 |

OTHER PUBLICATIONS

International Search Report and Written Opinion of the International Searching Authority, Dec. 13, 2006.

\* cited by examiner

METHOD AND APPARATUS PROVIDING IMAGER NOISE REDUCTION USING PARALLEL INPUT ARITHMETIC MEAN MODULES

CROSS-REFERENCE TO RELATED APPLICATIONS

This patent application claims priority to Japanese patent application No. 2005-211477 filed on Jul. 21, 2005 in the Japan Patent Office, the entire content of which is incorporated by reference herein.

FIELD OF THE INVENTION

The present invention relates generally to semiconductor imagers. More specifically, the present invention relates to noise correction in semiconductor imagers.

BACKGROUND OF THE INVENTION

Various types of imagers or image sensors are currently used, including charge-coupled device (CCD) image sensors and complementary metal-oxide semiconductor (CMOS) image sensors. CMOS technology offers many benefits, such as lower cost, ease of manufacturing, and a higher degree of integration over the CCD image sensors. However, a drawback of the CMOS image sensor technology is the presence of fixed-pattern noise (FPN). Fixed pattern noise is generated from a mismatch of circuit structures due to variations in the manufacturing processes of integrated circuits. The effect of fixed pattern noise in a CMOS image sensor is that groups of pixels, typically each column in a sensor array, exhibit relatively different strengths in response to uniform input light. FIG. 1 demonstrates the effect of fixed pattern noise on an image. In FIG. 1, an image 110 is sensed by the CMOS image sensor 120 via a sensor array 130. The sensor array 130 includes a matrix of pixel cells 132. Because of noise in the sensor array 130, a noise-corrupted image 140 is generated by the CMOS image sensor 120. Fixed pattern noise is largely responsible for the column-wise distortion apparent in the noise-corrupted image 140.

Fixed pattern noise is not the only noise source existent in a CMOS image sensor. Row noise—noise common to all pixels in a given row—may also exist. In FIG. 2, an image 210 is sensed by the CMOS image sensor 220 via a sensor array 230. The sensor array 230 includes a matrix of pixel cells 232. Because of noise in the sensor array 230, a noise-corrupted image 240 is generated by the CMOS image sensor 220. Row-wise noise is largely responsible for the row-wise distortion apparent in the noise-corrupted image 240. Even after correcting column-wise fixed pattern noise, row noise may still be evident in the corrected image.

To remove the effect of fixed pattern noise, conventional calibration processes involve measuring an output based on a known optical input and comparing it against an expected value. In CMOS image sensors, a light of known intensity and frequency is typically shone onto the sensors and used as an input calibration signal. In some cases, output from inactive dark pixel sensors may also be used during calibration to compare the sensors' output to an expected dark output. In principle, if there is no mismatch in the sensor devices, the voltage signal output from every pixel cell should be identical. In reality, however, significant differences in signal output values are read out between the pixel columns of the sensor array, even when a uniform input light stimulus is applied to the array. The difference between the pixel signal output values and the expected pixel signal output values is typically referred to as a pixel offset. The pixel offsets are computed and then stored for use in calibrating the entire sensor array.

In a conventional sensor array calibration procedure employing an offset reduction procedure, a respective calculated offset is applied to the output of each pixel during normal image sensor operation. A pixel whose un-calibrated output was higher than expected will have its signal output value reduced by the amount of its corresponding scaled offset value. Similarly, a pixel whose un-calibrated output was lower than expected will have its signal output value increased by the amount of its corresponding scaled offset value. Any change in operating mode that would affect the offset values will result in a necessary recalculation of offset values for each pixel.

Generating and storing accurate pixel offset values requires calculation time and additional memory resources. FIG. 3 show a conventional CMOS image sensor 300. The image sensor 300 includes a pixel array 310 organized into N pixel columns and R pixel rows. Upon readout of a row, parallel pixel outputs from each column (or N pixel outputs) are sent to a set of analog-to-digital converters (ADCs) 320. The digitized output from each pixel column is then sent to a set of readout buffers 330. In a typical image sensor 300, the digitized pixel outputs are processed into a serial data stream 340. Each of the array rows is read-out in row-by-row fashion. Generally, operations such as column-wise offset calibration and row noise correction (block 350) are applied to the serial data stream 340. In other words, the noise reducing processes are applied to each pixel output, sequentially, in the serial data stream 340. The result is that the noise reduction processes add significant delay to the overall readout of the N by R pixel signals. In addition, the offset values are measured from an expected reference value during calibration, thereby requiring a large number of bits, and therefore memory capacity, to represent the offset values.

There is, therefore, a need and desire for a method and apparatus for efficiently generating and applying noise correction values to pixel outputs of a CMOS imager, while reducing the required memory capacity.

BRIEF SUMMARY OF THE INVENTION

The invention provides a method and apparatus that efficiently generates and applies noise correction values to the pixel outputs of a CMOS imager.

In one exemplary embodiment of the invention, noise correction values are generated through the calculation of pixel offset values and average pixel output values during a calibration procedure. For each read calibration row, an average pixel output value is determined for a plurality of pixel output values from a corresponding plurality of pixel columns of the row. An offset value for each of the plurality of pixel outputs is further generated by finding the difference between each of the plurality of pixel outputs and the calculated average pixel output value. Offset values are found in a similar manner for pixels on other calibration rows. Offset values in each column are then averaged to determine a single offset value for each column.

In another exemplary embodiment of the invention, an offset value for an entire row of pixel outputs may be calculated by finding the average pixel output value for a plurality of optically black pixels in the imager row. The average pixel output value for the optically black pixel values may be refined by discarding pixel values outside a threshold window and substituting the average pixel output value and calculate a new average pixel value. Because the output from an optically black pixel represents signal-independent noise, the negative average pixel output can be treated as an offset value.

During image acquisition by the imager, noise in acquired images may be reduced by summing a digitized pixel output value with its corresponding offset value. Calculation of the averages and pixel offset values may be facilitated by the use of parallel input arithmetic mean modules.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

The present invention is now described in more detail with respect to various exemplary embodiments. This is for convenience only and is not intended to limit the application of the present invention. Moreover, the present invention can be implemented using software, hardware or any combination thereof as is known to one of ordinary skill in the art.

In an embodiment of the present invention, noise reduction calibration processes are applied to row-by-row parallel column pixel outputs from a CMOS image sensor. The results of the noise reduction calibration processes are stored for subsequent application to a serial data stream of the pixel outputs.

Figure 1:
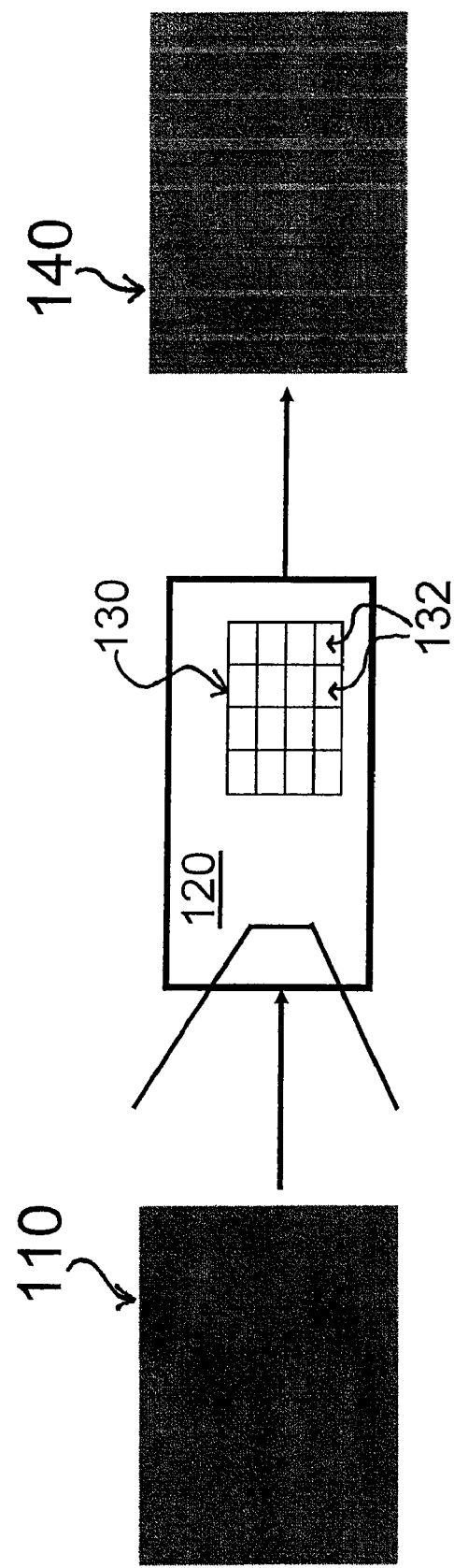
FIG. 1 is a block diagram of a prior art imaging system that shows the effects of fixed-pattern noise on an image processed by the system.
Figure 2:
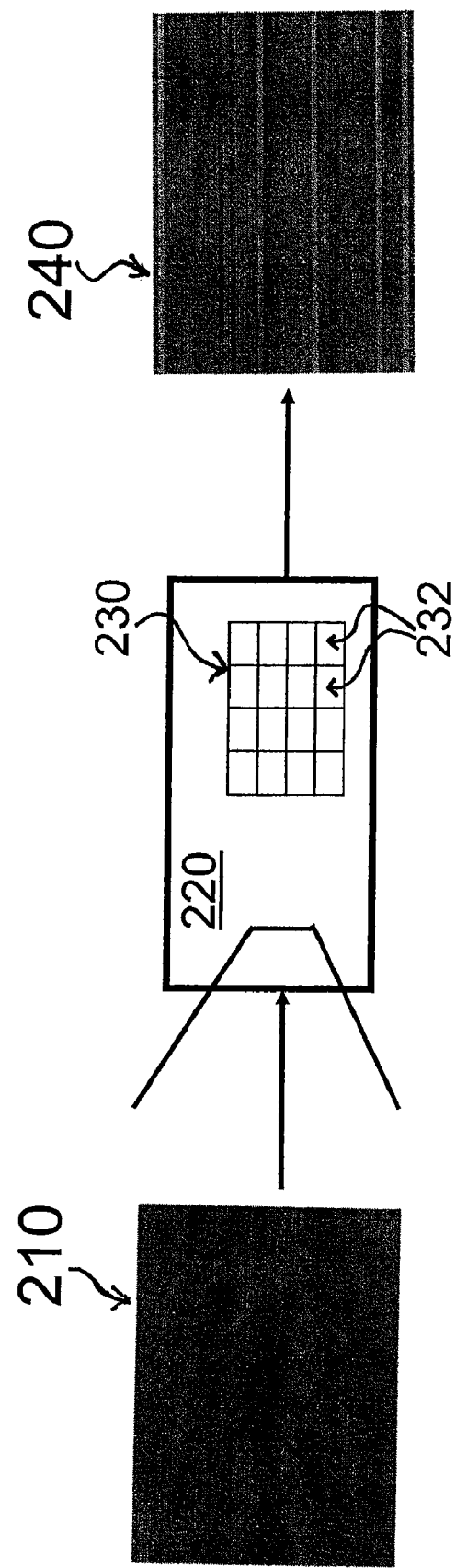
FIG. 2 is a block diagram of a prior art imaging system that shows the effects of row-wise noise on an image processed by the system.
Figure 3:
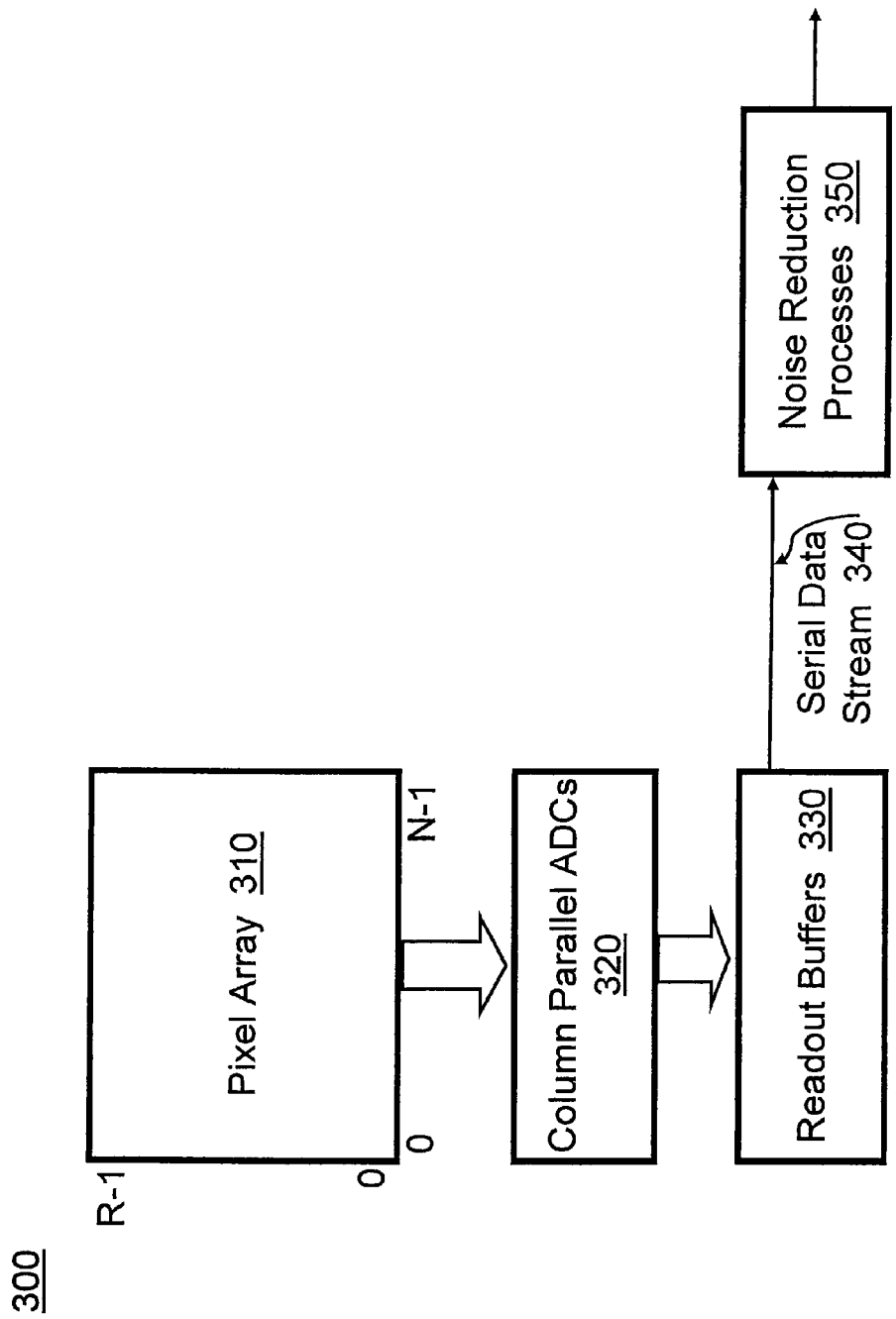
FIG. 3 is a block diagram of a prior art CMOS imager.
Figure 4:
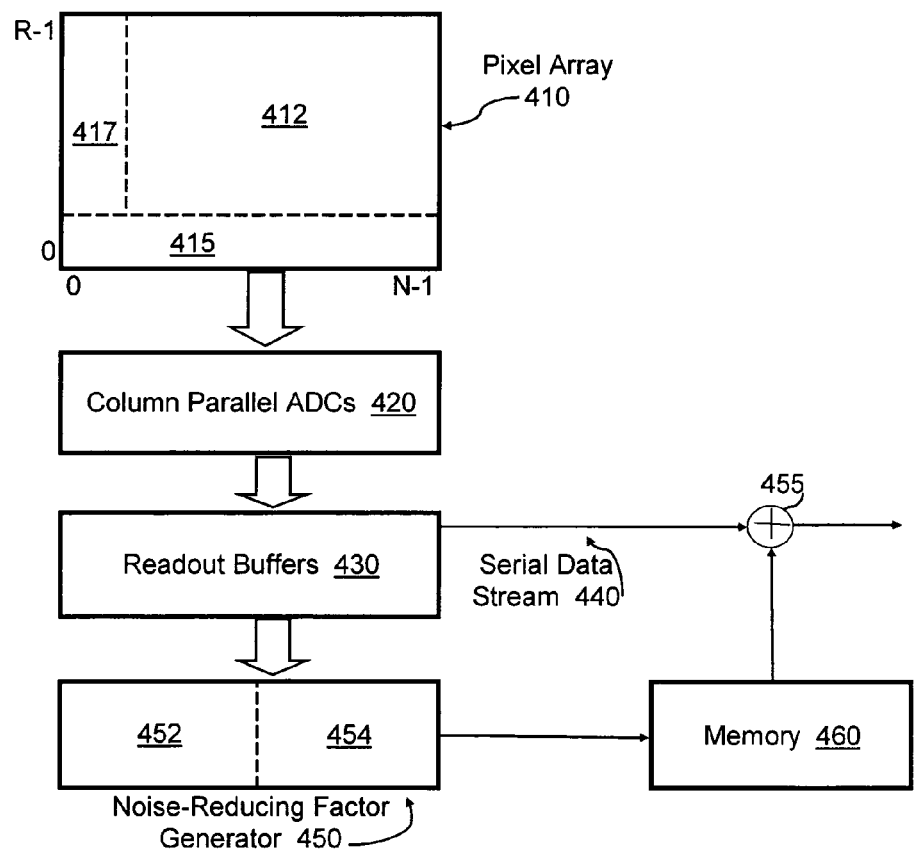
FIG. 4 is a block diagram of a CMOS imager according to an exemplary embodiment of the present invention.

Referring now to FIG. 4, a CMOS imager 400 constructed in accordance with an embodiment of the invention includes a pixel array 410, a set of analog-to-digital converters (ADCs) 420, and a set of readout buffers 430. The pixel array 410 is organized into N pixel columns and R pixel rows. The pixel array 410 contains an active area 412, a column-wise calibration area 415 and a row-wise calibration area 417. Pixel outputs from the N pixel columns of pixel array 410 are digitized by the parallel ADCs 420, and then temporarily held by the readout buffers 430. Similar to the CMOS imager of FIG. 3, the digitized pixel outputs for all columns of an array row are transferred from the readout buffers 430 via a serial data stream 440, and all array rows are read-out in a row-by-row fashion. In addition, noise reducing pixel offsets produced during a calibration process are stored in memory 460 and the stored offsets are combined in combiner 455 with respective pixel outputs in serial data stream 440 produced during an image acquisition and readout. By generating and storing noise-reducing offsets through parallel analysis of pixel outputs during a calibration period rather than calculating them from the serial data stream 440, more pixel outputs are analyzed in a given period of time and noise-reducing offsets are generated more rapidly. In addition, as explained more fully below, a reduced number of memory bits are required for storing offset values, reducing the required capacity for offset storage.

Generation of the noise-reducing offsets is implemented via a column-wise offset calibration module 452 and a row noise correction module 454. The noise-reducing offsets generated by the noise-reducing factor generator (block 450) are stored in a noise reduction memory block 460. The noise-reducing offsets stored in the noise reduction memory block 460 are applied, as needed, to modify pixel outputs carried in the serial data stream 440 during normal imager operations.

According to the exemplary embodiment of the invention shown in FIG. 4, the generation of column-wise noise-reducing offsets occurs during the calibration of a pixel array by an imager. Imager calibration occurs before normal imager operations, or at any time when the imager may need calibration. The generation of noise-reducing offsets is accomplished by applying a reference light signal or voltage signal to the column-wise calibration area 415. The applied reference light signal may be a signal reflecting the absence of any incident light, or some other reference value of applied light. Alternatively, the applied reference voltage signal may be a known voltage applied internally to the pixel array 410, simulating the application of a light signal. The column-wise calibration area 415 includes several rows of the pixel array 410, the included rows usually located near the edges of the pixel array 410. The column-wise offset calibration module 452 reads pixel outputs resulting from the reference light signal or voltage signal being applied to the column-wise calibration area 415. The column-wise offset calibration module 452 reads the N pixel outputs for a given row of pixels in increments of n pixel outputs, where n relates to the number of inputs to the column-wise offset calibration module 452. For example, a row containing 1024 pixel outputs (or 1024 columns) could be read in 128 sets of eight if the column-wise offset calibration module only had eight inputs (here, n would equal eight). An average pixel output is found for each set of n pixel outputs (in the given example, each set of eight). Offset values for each of the n pixel outputs are then calculated from the average. Each of the calculated offset values represent the difference between one of the n pixel outputs and the corresponding average pixel output for the respective set of n pixel outputs. This method of calculating offset values differs from typical methods that determine the offset value in relation to the difference between a pixel output and an expected pixel output (which refers to the pixel output that is expected for each pixel for a given reference signal). By instead calculating offset values with reference to the average pixel output, offset values may be stored using less memory. In other words, instead of storing potentially large pixel offset values (generated with respect to the expected pixel output) each requiring a high number of memory bits, the column-wise offset calibration module 452 stores n relatively small pixel offset values (generated with respect to the average of the n pixel outputs), each requiring only a low number of memory bits, reducing memory requirements. This is demonstrated in FIGS. 5 and 6A.

Figure 5:
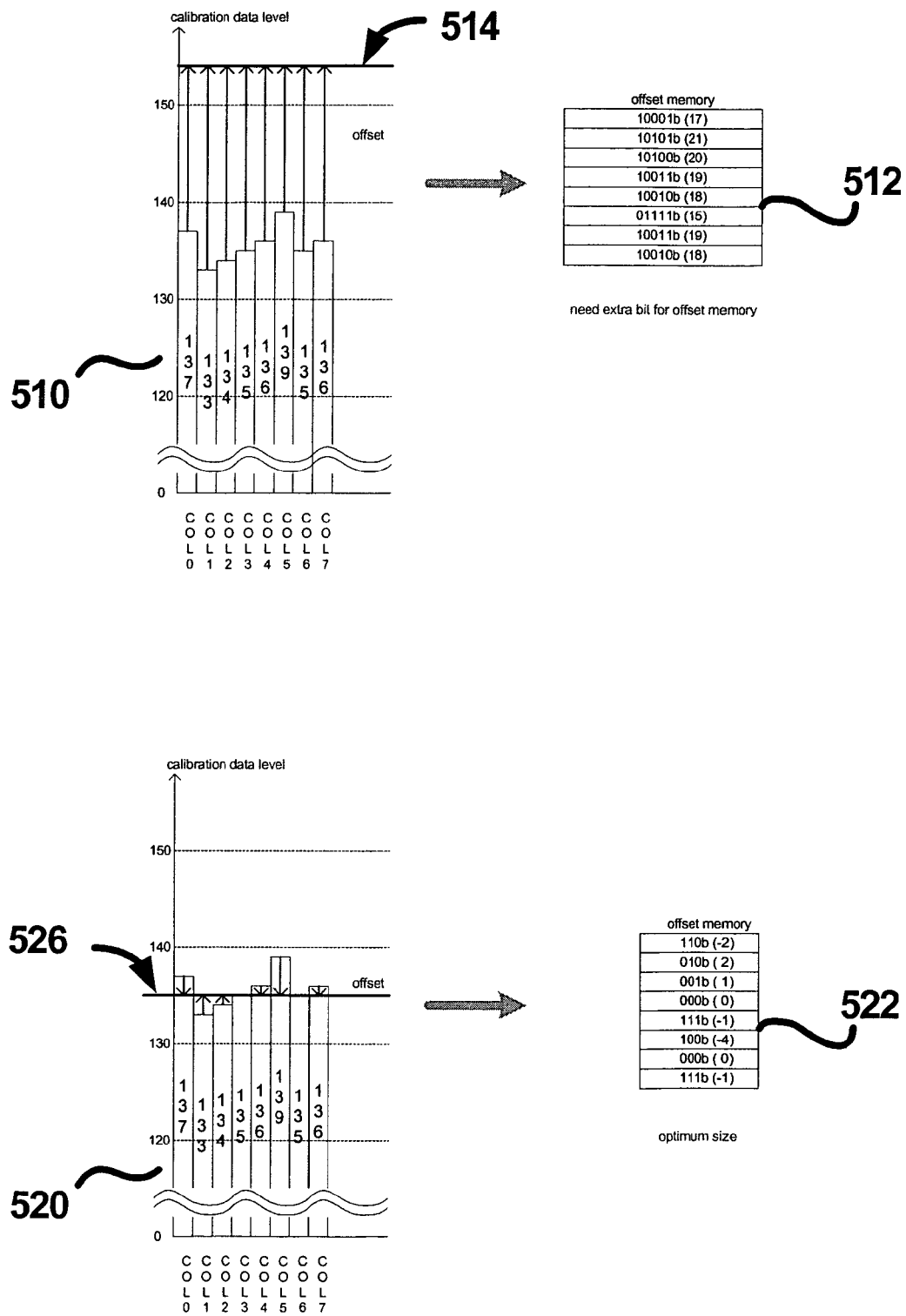
FIG. 5 is a block diagram demonstrating the memory requirements of storing pixel offset values according to an exemplary embodiment of the present invention.

FIG. 5 demonstrates the bit depth required by both the standard offset memory technique (block 510) of the conventional imager 300 (FIG. 3) and the reduced offset memory technique (block 520) of the present invention, as applied to a set of n pixel outputs. In the standard offset memory technique (block 510), pixel outputs from a set of n columns (for convenience, n will be assumed to be eight) are each compared with an expected pixel output 514, and corresponding pixel offsets are calculated representing the difference between each of the n pixel outputs and the expected pixel output 514. By way of example only, exemplary pixel output values and an expected pixel output 514 are indicated in FIG. 5. Using the example values in block 510, offset values for each of the n pixels are calculated and stored in memory block 512. In the given example, memory block 512 requires a bit depth of at least five bits in order to store each offset value because of the possible magnitude of the difference. In the examples shown, the pixel values range from binary values 0 to 255. A calibration reference level 514 is set at about a value of 154. In contrast, block 520 demonstrates the reduced offset value memory requirements associated with the invention. The same exemplary pixel output values are used in block 520 as used in block 510. Using the exemplary pixel output values, an average pixel output value 526 is generated for the set of n pixels, and then offset values for each of the n pixel outputs are calculated with respect to the average pixel output value 526. The resulting offset values are stored in memory block 522. In the given example, because the average pixel value is closer to the actual pixel value, a bit depth of only three bits is required to store the pixel offset values.

Figure 6A:
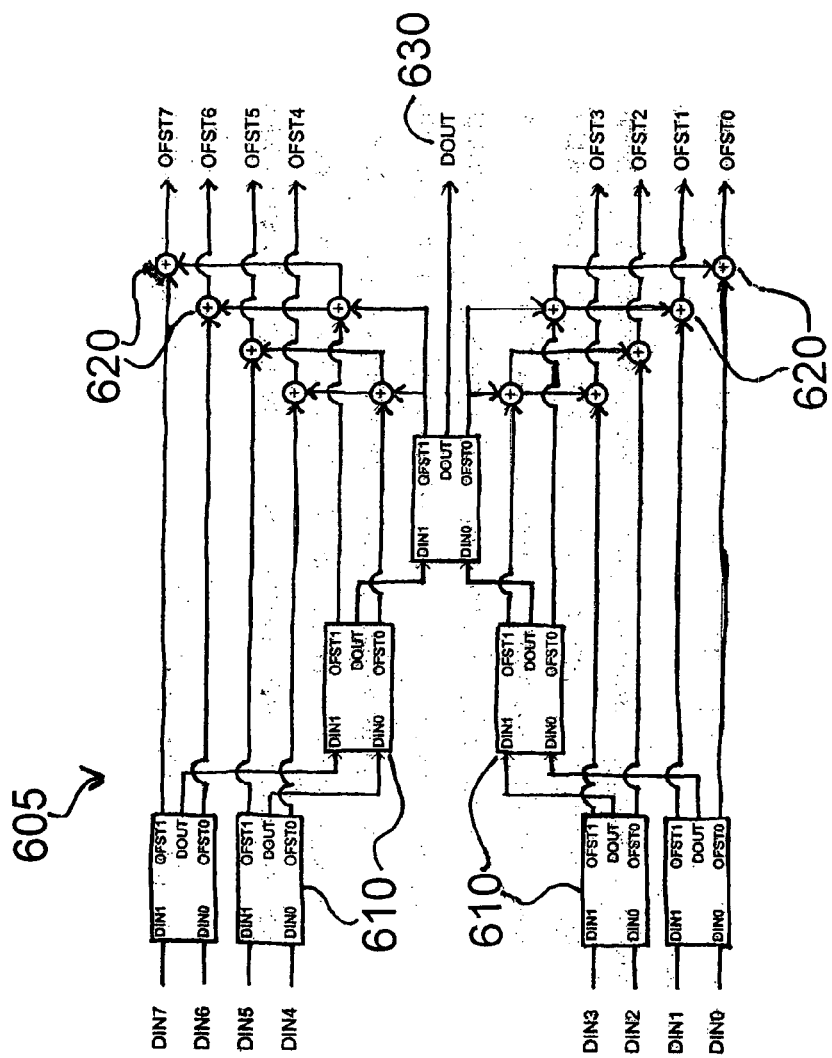
FIGS. 6A and 6B are block diagrams of a parallel input arithmetic mean circuit with arithmetic mean units, according to an exemplary embodiment of the present invention.
Figure 6B:
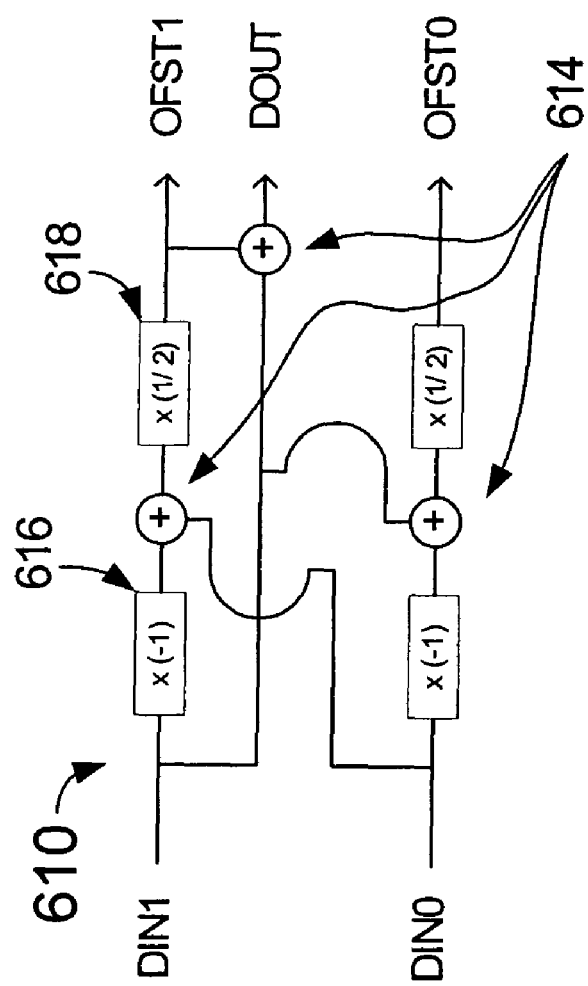

FIG. 6A represents a block diagram of one of several column-wise offset calibration circuits 605 which may be used in parallel in calibration module 452 for each of the sets of n pixel outputs from readout buffer 430 (FIG. 4). In the circuit of FIG. 6A, a plurality of arithmetic mean units 610 are used, each of which determines an average and an offset from the average for a pair of the n inputs to the units. The units 610 are arranged as shown with adders 620 to form a single circuit 605, which provides an average of the n pixel outputs applied as input signals DIN0-DIN7 to circuit 605 at output 630 along with pixel offset values for each of the applied signals from the average as outputs OFST0-OFST7. As before, and for purposes of example only, n equals eight. So, using only arithmetic mean units 610 and adders 620, the n input pixel outputs are transformed into an average pixel output 630 (shown as signal DOUT) and n reduced memory offset values (shown as signals OFST0-7). Because the column-wise offset calibration module contains no registers, the calculated offset values OFST0-OFST7 are generated without delay. An example of an arithmetic mean unit 610 is depicted in FIG. 6B. The arithmetic mean unit 610 of FIG. 6B outputs the average and the offset from the average of two inputs using only adders 614, multipliers 616 and dividers 618.

The offset-calculating process described in FIG. 6 is repeated for each set of n pixel outputs within a row using a respective circuit 605 for each set of n pixel outputs. In the event that n equals N, only one circuit 605 is necessary. Alternatively, each set of n pixel outputs within a row can be multiplexed to a single circuit 605. In either event, after an entire row of N pixel outputs has been processed, the column-wise offset calibration module 452 (of FIG. 4) will have output N/n average pixel outputs and N offset values.

If the number of average pixel outputs per row is more than one (if N/n is greater than one), then the circuit 605 must be used again in further rounds of averaging in order to account for variations between the average pixel outputs of each set of n pixel outputs. In a second round of averaging, an average pixel output for each set of n previously calculated average pixel outputs is found. For example, as explained above, a pixel array where N equals 1024 and n equals 8 would initially result in 128 average pixel outputs. These 128 average pixel outputs can be further averaged in a second round of averaging using the circuit 605 to find 16 average pixel outputs (128 divided by n, where n equals eight). A third round would result in two average pixel outputs. A single average pixel output for the entire row of N pixel outputs would be found during a fourth round of averaging. Offsets for each of the N pixel outputs are calculated by summing the related offsets from each round of averaging. In this way, offsets for each of the N pixels represent the difference between the pixel output value and the average output value for all N pixels in the row.

Because the offset-calculating process described with reference to FIG. 6A is repeated for each set of n pixel outputs within a row, and repeated again for every row in the column-wise calibration area 415, an offset value is found for every pixel in the column-wise calibration area 415. In other words, each column in the array is associated with as many offset values as there are rows in the column-wise calibration area 415. An average column offset value is found from the calculated offsets for each column and then stored in memory 460. Since fewer bits are required to store the offset values referenced to an average, memory 460 can have smaller capacity than if offsets are determined from a fixed reference point.

Once the offset values are calculated according to the process described above, the offset values may be used to reduce column-wise noise. During readout operations, digitized pixel outputs in the serial data stream 440 (of FIG. 4) contain noise. The noise may be reduced by summing each output pixel value with the pixel's corresponding average column offset value in combining circuit 455 (FIG. 4). In this way, hardware-caused, column-wise variations in pixel output values are smoothed over all N columns of pixel outputs.

To ensure that pixels from different rows of the array are smoothed consistently, the row-noise correction module 454 (of FIG. 4) may be used in a second embodiment of the invention. Referring again to FIG. 4, the row noise correction module 454 acts to generate noise-tolerant row-wise offset values. To accomplish this, the row noise correction module 454 reads pixel output signals originating from the row-wise calibration area 417. The pixels in the row-wise calibration area 417 are optically black pixels, meaning that the pixels in the row-wise calibration area 417 are not exposed to a light source. As a result, the pixel output signals from the pixels in the row-wise calibration area 417 represent signal-independent noise. As each row is read-out from the pixel array 410, pixel output signals from pixels within the row-wise calibration area 417 are input to the row noise correction module 454 in increments of n output signals. For each set of n output signals, an average output signal is calculated. The calculation of average output signals from the row-wise calibration area 417 can be accomplished using the same circuit as used for the column-wise calibration module 452, shown in FIG. 6A. For example, using the circuit of FIG. 6A, the row noise correction module 454 calculates the average of the n pixel outputs from a row of pixels within the row-wise calibration area 417. If the number of pixels within the row-wise calibration area 417 is greater than n, the circuit of FIG. 6A is used repeatedly until an average pixel output value has been found for the entire row of pixels within the row-wise calibration area 417. Because the calculated average represents signal-independent noise, the calculated average pixel output can be used as an offset value for the respective row of pixel outputs. In reducing noise, each pixel output in a row is reduced by the amount of the corresponding calculated average pixel output or offset from the row-wise calibration area 417.

The averaging process utilized by the row noise correction module 454 ensures that the calculated average pixel output generated by the row noise correction module 454 is not unduly influenced by pixel outputs that vary significantly from the average pixel output during row-wise offset calculation. For example, when using an averaging circuit such as that demonstrated in FIG. 6A, if one of the n pixel output values varies significantly from the remaining n−1 pixel output values, the calculated average pixel output for that set of n pixel outputs is shifted in the direction of the one noisy pixel output value. To avoid the described noise-related shift in the average pixel output value of a set of n pixels, a method of refining the calculated average pixel output values is used in the second embodiment of the invention. Refined row-wise average pixel outputs are determined by the taking of multiple averages of pixel outputs, where the values of pixel outputs with significant noise are replaced with the most recently calculated row-wise average pixel output.

Figure 7:
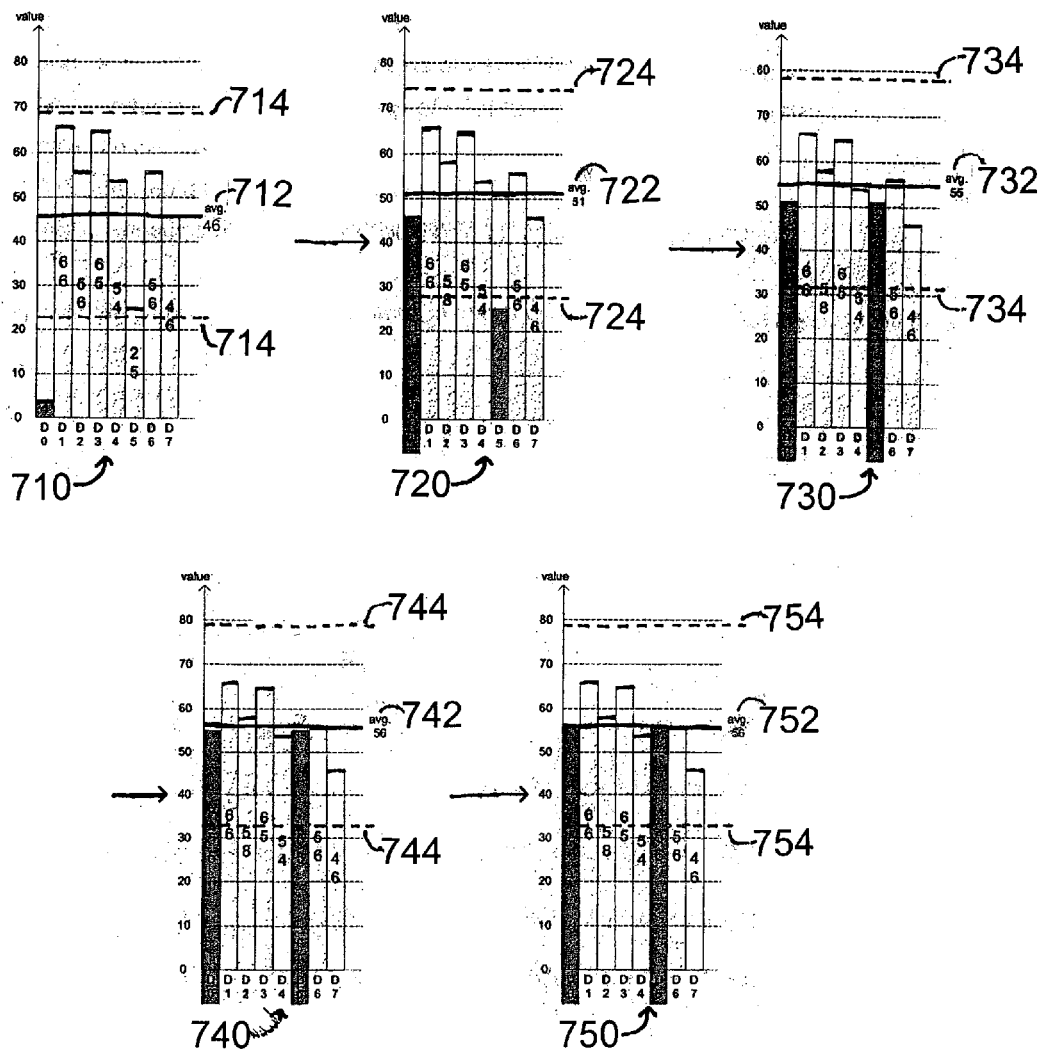
FIG. 7 is a block diagram demonstrating a method of calculating a multi-frame noise-tolerant average pixel output value according to an exemplary embodiment of the present invention.

FIG. 7 demonstrates a row noise correction method performed by the row noise correction module 454 of FIG. 4, in accordance with the second embodiment of the invention. In block 710, an average pixel output 712 is calculated from a set of n pixel outputs from a plurality of pixel outputs on a row, using the circuit described with reference to FIG. 6A. In this case, and by way of example only, n again equals eight pixel outputs (shown as signals D0-7). Various example values for the n pixel outputs are shown. For example, D0 has a value of 4, D1 has a value of 66, and so forth. Because these pixel outputs are from optically black pixels, the pixel outputs are significantly less than the outputs generated during the column-wise calibration process. The calculated average pixel output 712 of the pixel outputs D0-7 is generated using a circuit such as that demonstrated in FIG. 6A. Using the example pixel output values D0-7 of block 710 for one set of n pixels, the calculated average pixel output 712 is determined to be 46. In block 710, pixel output D0 is identified as varying from the calculated average pixel output 712 in excess of a predetermined noise threshold 714. Here, by way of example only, the predetermined noise threshold has been set at 23, meaning that any pixel output that is not within ±23 of the calculated average pixel output 712 is identified as a pixel output with excessive noise. Accordingly, in order to refine the average pixel output, the value of pixel output D0 in block 720 is set equal to the previously calculated average pixel output 712 for the n set of pixels. That is, the signal D0 in block 720 is changed from 4 to 46. In block 720, a new average pixel output 722 is calculated for the set of n pixels—the new calculated example value is 51. A second pixel output D5 is also identified as a pixel output varying significantly from the new calculated average pixel output 722, wherein the difference between pixel output D5 and calculated average pixel output 722 exceeds the predetermined noise threshold 724. Accordingly, in block 730, both pixel outputs D0 and D5 are set to equal the value of the previously calculated average pixel output 722 (both are set to equal 51, the value of calculated average pixel output 722). Using these new values, a new average pixel output 732 is calculated. This process continues until the newly calculated average pixel output is equal in value to the previously calculated average pixel output. Or stated otherwise, the process continues until there are no pixel values in the set n which exceed the noise threshold based on the last calculated average value. In FIG. 7, this occurs when the average pixel output 752 in block 750 is calculated, the average pixel output 752 being equal in value to the average pixel output 742 of block 740. If any other pixel outputs had exceeded the predetermined noise thresholds 714, 724, 734, 744, 754, their outputs would also have been set to equal the previously calculated average pixel output.

Using the method shown in FIG. 7, a refined, noise-tolerant time-elapsed average pixel output is determined for each set of n pixel outputs in each of the rows of the row-noise calibration area 417 (of FIG. 4). Where the number of outputs per row in the row-wise calibration area 417 exceeds n, multiple rounds of averaging using the method of FIG. 7 and the circuit of FIG. 6A results in a single noise-tolerant average pixel output for each row. Significant noise, or noise that exceeds the predetermined noise threshold levels, is not considered in the calculation of the average pixel output. In this way, row-wise offsets are generated and may be stored in the memory 460. Once the row-wise offset values are calculated, the offset values may be used to reduce row-wise noise in the same manner that column-wise offsets were used, as described above. During read-out operations, noise in the digitized pixel outputs in the serial data stream 440 (of FIG. 4) may be reduced by decreasing each output pixel value in a row by the value of the pixel's corresponding average row-wise offset value via combining circuit 455 (FIG. 4). In this way, row-wise variations in pixel output values are smoothed over all rows of pixel outputs.

Figure 8:
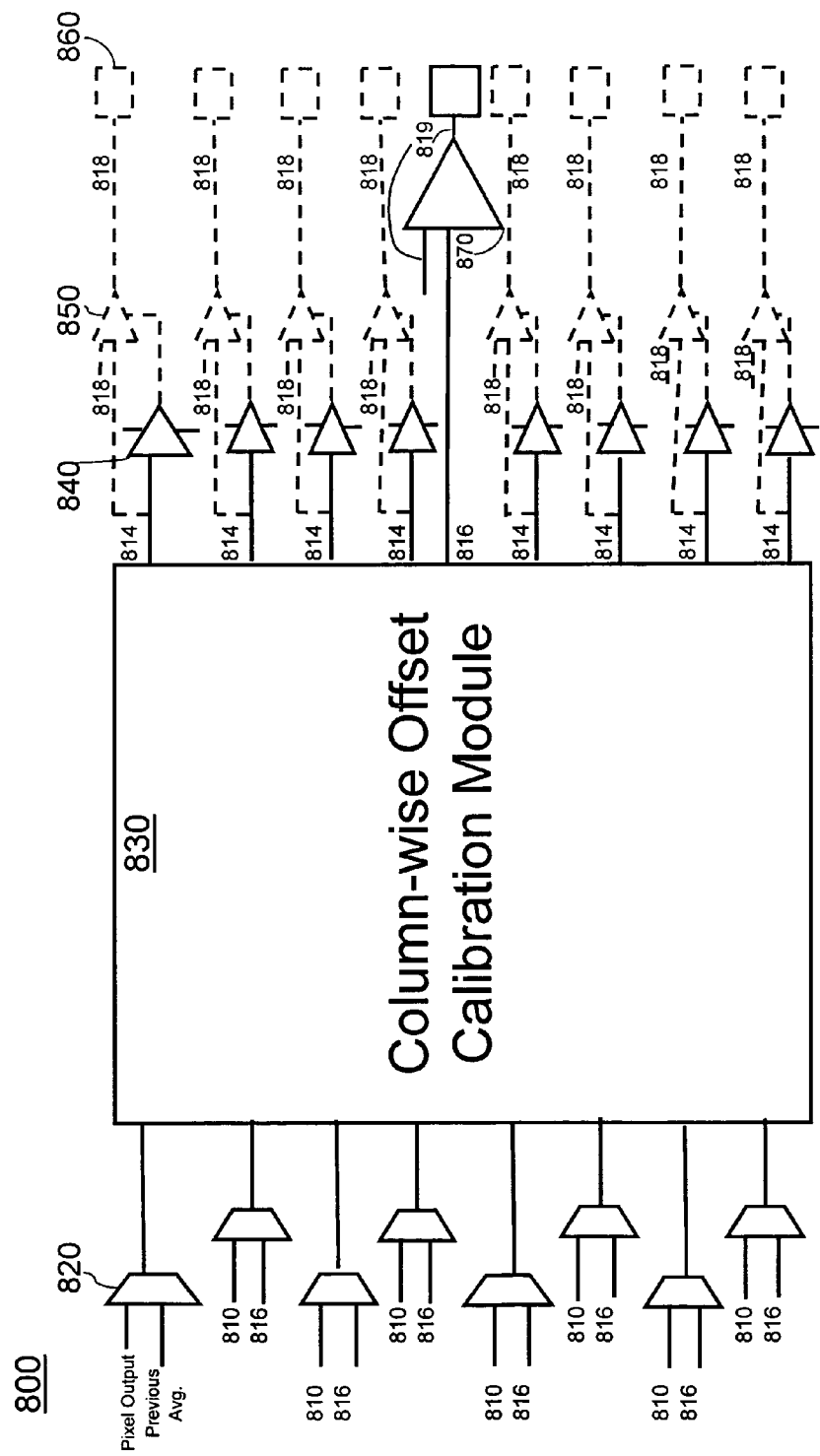
FIG. 8 is a block diagram demonstrating how a parallel input arithmetic mean circuit is used by the method of FIG. 7, according to an exemplary embodiment of the present invention.

FIG. 8 demonstrates a block-diagram of a noise-tolerant time-elapse averaging circuit 800 implementing the row noise correction module 454 (of FIG. 4). The noise-tolerant time-elapse averaging circuit 800 accepts as input digitized pixel output signals 810 for a set n of pixels of a row in the row-wise calibration area 417. There are a plurality of circuits 800 corresponding to the number of sets n of pixels in each row of the row-wise calibration area 417. Alternatively, one circuit 800 may be used, in which case each set of n pixels in a row are multiplexed into circuit 800 and processed. Additionally, if there are only n pixels per row within the row-wise calibration area 417, then only one circuit 800 is necessary. The digitized pixel output signals 810 input to circuit 800 are selected as input by a plurality of input selectors 820 whose role will be made clear below. The outputs of the input selectors 820 are then input to an averaging circuit 830, such as the circuit represented in FIG. 6A. The output signals of the averaging circuit 830 include a plurality of offset signals 814 and an average pixel output signal 816. The offset signals 814 are each evaluated by comparators 840 to determine if a predetermined noise threshold has been exceeded. If the threshold is exceeded by an offset signal 814, then the respective input selector 820 is set to select the average pixel output signal 816 as an input for future iterations of the noise reducing processes. Optionally, respective adders 850 may also be activated if the threshold is exceeded by an offset signal 814. The optionally activated adders 850 sum the respective offset signal 814 as output from the circuit 830 with the corresponding stored offset signal 818. In this way, offset values for high-noise pixel outputs may be optionally calculated and stored while still using the process of FIG. 7 to obtain an average pixel output value that is not affected by high noise. The noise reduction module 800 is used in repeated iterations until the stored average pixel output 819 and the calculated average pixel output 816 are found to be equal by comparator 870.

In a third embodiment of the invention, the column-wise calibration module 452 of the first embodiment and the row noise correction module 454 of the second embodiment are used together to provide two offsets for each pixel in the active area 412 of the pixel array 410. An advantage of the third embodiment of the invention, in addition to using two offset values for each pixel to thus smooth image output in both dimensions of the pixel array, is that both the column-wise offset calibration module 452 (of FIG. 4) and the row noise correction module 454 (of FIG. 4) can utilize the same circuit shown in FIG. 6A, and thus the circuit area required by the offset calculation processes is greatly reduced. Also, because the offset calculation processes act upon a set n of parallel pixel outputs, overall calculation times are reduced. Additionally, because of the simplicity of the circuit used possible additional error-checking and troubleshooting steps used in the operation of the CMOS imager are also simplified.

Referring again to FIG. 4, once the offset values are calculated from the refined average for a set of pixels n, both the row and the column offset values are stored in the memory 460. During actual image acquisition, the stored offset values are summed with the corresponding pixel output values in the serial data stream 440 for noise reduction.

Figure 9:
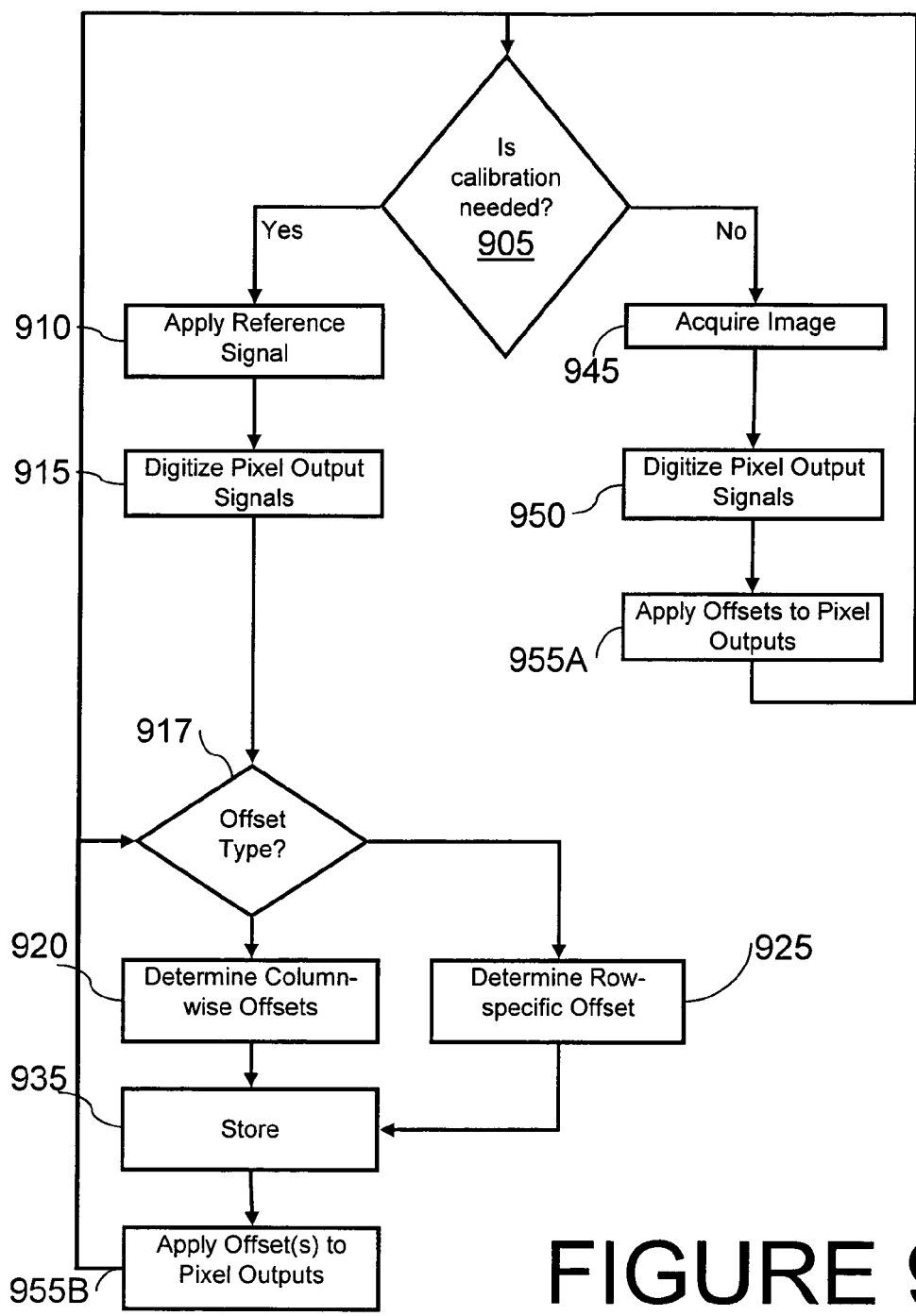
FIG. 9 is a flowchart of the steps of a noise reduction process, according to the described exemplary embodiments of the present invention.

FIG. 9 is a flowchart summarizing the steps of the third embodiment of the invention, as described above. Initially, a determination of whether calibration of the imager is necessary (see block 905). Calibration is necessary when the imager has first been turned on, when the operating mode of the imager has changed, or may be performed as desired. If it is determined that calibration is necessary, then a reference light or voltage signal is applied to the column-wise calibration area of the pixel array (block 910). All pixel outputs are then digitized, including the pixel outputs from the rows in the column-wise calibration area (block 915). In block 917, a decision is made as to which type of offset should be measured and applied. If column-wise offsets are to be determined, the column-wise calibration module reads n of the digitized pixel outputs from the column-wise calibration area (block 920). From those n pixel outputs, an average pixel output for the n pixel outputs is determined and the associated pixel offset values are calculated. Additional digitized pixel outputs from the same row of the column-wise calibration area are also input to either additional column-wise calibration modules or are multiplexed into a single column-wise calibration module. By iteratively using the column-wise calibration module(s), an average column signal output value is determined for each row of pixels in the column-wise calibration area 415. Individual pixel offsets measured in relation to a corresponding average column signal output value are also determined for each pixel in the column-wise calibration area 415. An average column offset is found for each column in the multiple rows within the column-wise calibration area. Thus, a column offset value for each column in the array is determined. Column offsets are stored after calculation (block 935).

When pixels from the row-wise calibration area are read-out, an average pixel output for each row for the portion of pixels located within the row-wise calibration area 417 is determined (block 925) through a noise-tolerant, time elapse averaging process using the same basic arithmetic mean circuit used in generating the column offset values. The negative value of the calculated average pixel output for each row is a row offset value, since the pixels in the row-wise calibration area 417 are optically black. A calculated row offset value is stored (block 935) and then both the row offset value and the stored column offset values are applied to the pixel outputs read-out from the corresponding row (block 955B). After application of the offsets to a row of pixel outputs, the next row is read-out from the array. Once again, a row offset value is calculated and stored, and then both the newly-calculated row offset and the stored column offsets are applied to the pixel outputs of the newly read-out row. This process continues until all rows from the pixel array have been read-out, and a row offset value has been calculated for each row in the active area 412 of the array 410.

Because the calculated offsets may be applied to an acquired image during calibration, the above-described calibration process may be used concurrently for any or all image acquisitions performed by the imager. Alternatively, the offset values are stored and may be used in a non-calibration mode wherein the image is acquired (block 945), the resulting pixel signals are digitized (block 950), and then both the stored row and column offsets are applied to corresponding pixels (block 955A). Noise in the acquired signals is reduced by summing a pixel offset value with each corresponding digitized pixel output signal. In the first embodiment of the invention, the applied noise reduction operation will result in column-wise smoothing in the acquired images. The column-wise smoothing is an immediate result of the summation of pixel offset values with the pixel outputs. In the second embodiment of the invention, acquired images will exhibit row-wise smoothing. The row-wise smoothing is a result of the determination of noise-tolerant average row pixel output values, thus making the results of pixel offset calculation more uniform across the rows of the imager array. In the third embodiment of the invention, acquired images will exhibit both row-wise and column-wise smoothing.

Although an exemplary embodiment of the invention has been shown, a person of ordinary skill in the art would recognize that the invention is not limited to a hardware implementation. The invention may be implemented in either hardware, software or any combination thereof.

Figure 10:
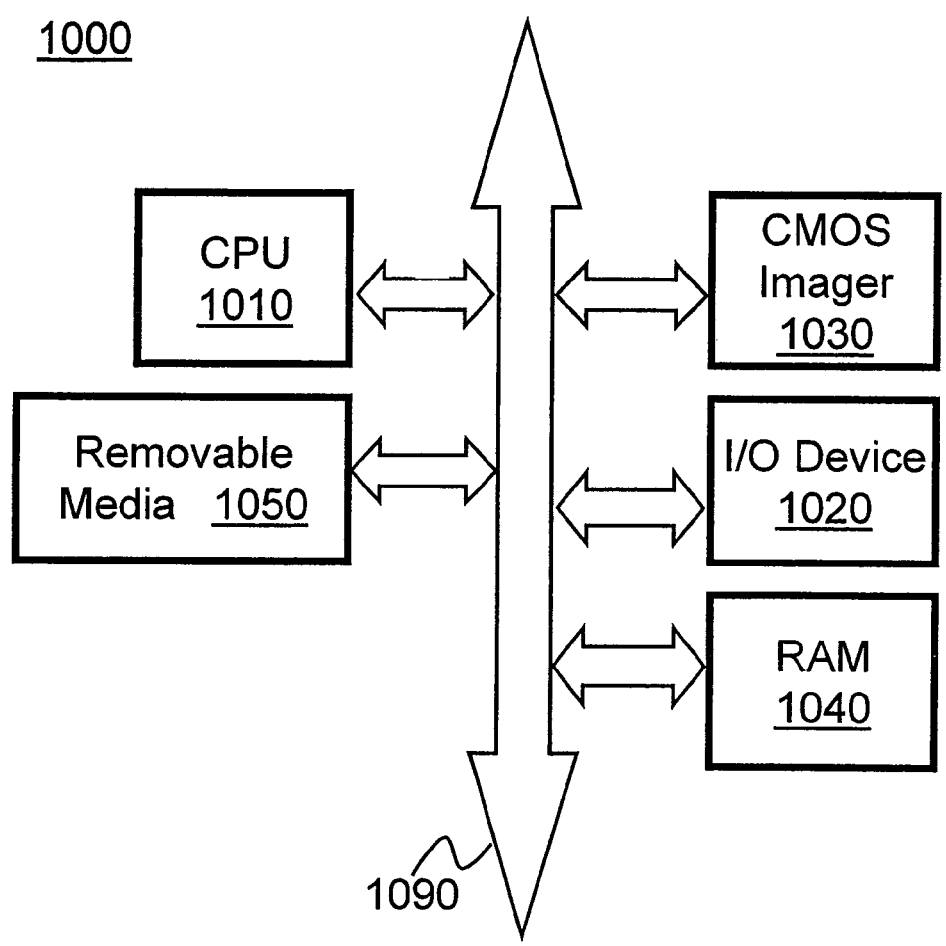
FIG. 10 is a block diagram of a processor system according to an exemplary embodiment of the present invention.

A typical processor based system 1000, which includes a CMOS imager device 1030 having a pixel column and row noise correction system constructed according to the present invention is illustrated in FIG. 10. A processor based system is exemplary of a system having digital circuits which could include CMOS imager devices. Without being limiting, such a system could include a computer system, camera system, scanner, machine vision system, vehicle navigation system, video telephone, surveillance system, auto focus system, star tracker system, motion detection system, image stabilization system and other imaging applications.

A processor system, such as a camera system, for example, generally comprises a central processing unit (CPU) 1010, for example, a microprocessor, that communicates with an input/output (I/O) device 1020 over a bus 1090. The CMOS imager 1030 also communicates with the system components over bus 1090. The computer system 1000 also includes random access memory (RAM) 1040, and, in the case of an imaging system may include peripheral devices such as a removable memory 1050 which also communicates with CPU 1010 over the bus 1090. CMOS imager 1030 is preferably constructed as an integrated circuit which includes pixels containing a photosensor, such as a photogate or photodiode. The CMOS imager 1030 may be combined with a processor, such as a CPU, digital signal processor or microprocessor, with or without memory storage in a single integrated circuit, or may be on a different chip than the processor.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

What is claimed as new and desired to be protected by Letters Patent of the United States is:

1. A noise-reducing circuit of an imager, comprising:
a pixel value correction circuit for determining an average pixel output value for a plurality of pixel output values associated with a corresponding plurality of pixel columns in an imager row;
a column-wise offset calibration module configured to generate an offset value for each of the plurality of pixel outputs by computing the difference between each of the plurality of pixel outputs and the calculated average pixel output value;
a storage circuit for storing the offset values; and
an adding circuit configured to combine each offset value with a corresponding pixel output signal;
wherein said offsets are used to reduce imager noise in pixels in the imager row.

2. The noise reducing circuit of claim 1, wherein the offset values are generated and the average pixel output value is calculated using parallel input arithmetic mean modules.

3. The noise reducing circuit of claim 1, wherein the plurality of pixel output values are associated with n pixels in an imager row of N pixels, and the pixel value correction circuit, the column-wise offset calibration module, the storage circuit and the adding circuit are applied to each of a plurality of groups of n pixels in the imager row.

4. The noise reducing circuit of claim 1, further comprising a row-wise offset calibration module for determining an additional offset value for the plurality of pixel outputs by finding an average pixel output for a plurality of optically black pixels in the imager row.

5. The noise-reducing circuit of claim 4, wherein the row-wise offset calibration module is further configured to compute an initial average pixel output value for the plurality of optically black pixel output values, to set a reference average pixel output value to the initial average pixel output value, to identify pixel output values that differ in value from the reference average pixel output value by a predetermined threshold amount, and to determine a new reference average pixel output value after replacing the identified pixel output values with the prior reference average pixel output value.

6. The noise-reducing circuit of claim 5, wherein the row-wise offset calibration module is further configured to find whether the new average pixel output value is equal to the prior reference average pixel output value, to re-set the prior reference average pixel output value to the new average pixel output value, and to repeat the steps of identifying, determining, finding and re-setting until a newly determined average pixel output value is equal to a prior reference average pixel output value.

7. The noise-reducing circuit of claim 6, wherein said circuit is configured to repeat the steps of identifying, determining, finding and re-setting until there are no pixel output values that differ in value from the reference average pixel output value by the predetermined threshold amount.

8. A noise-reducing circuit of an imager, comprising:
calculating means to calculate an average pixel output value for a plurality of pixel output values associated with a corresponding plurality of pixel columns in an imager row;
generating means to generate an offset value for each of the plurality of pixel outputs by computing the difference between each of the plurality of pixel outputs and the calculated average pixel output value;
storage means to store the offset values; and
combining means to combine each offset value with a corresponding pixel output from a pixel in the imager row.

9. The noise-reducing circuit of claim 8, wherein the offset values are generated and the average pixel output value is calculated using parallel input arithmetic mean modules.

10. The noise-reducing circuit of claim 8, wherein the plurality of pixel output values are associated with n pixels in an imager row of N pixels, and the calculating means, the generating means, the storage means and the combining means are applied to each of a plurality of groups of n pixels in the imager row.

11. The noise-reducing circuit of claim 8, further comprising computing means to determine an additional offset value for the entire imager row by finding an average pixel output for pixels from an optically black portion of the imager row.

12. The noise-reducing circuit of claim 11, wherein the computing means further comprises:
computing means to find an initial average pixel output value for the optically black pixel output values;
setting means to set a reference average pixel output value to the initial average pixel output value;
identifying means to identify pixel output values that differ in value from the reference average pixel output value by a predetermined threshold amount; and
determining means to determine a new reference average pixel output value after replacing the identified pixel output values with the prior reference average pixel output value.

13. The noise-reducing circuit of claim 12, wherein the computing means further comprises:
finding means to determine whether the new average pixel output value is equal to the prior reference average pixel output value;
re-setting means to re-set the prior reference average pixel output value to the new average pixel output value; and
repeating means to repeat the use of the identifying, determining, finding and re-setting means until a newly determined average pixel output value is equal to a prior reference average pixel output value.

14. An imager, comprising:
a noise-reducing circuit, said noise-reducing circuit comprising:
a pixel value correction circuit configured to calculate an average pixel output value for a plurality of pixel output values associated with a corresponding plurality of pixel columns in an imager row;
a column-wise offset calibration module configured to generate an offset value for each of the plurality of pixel outputs by computing the difference between each of the plurality of pixel outputs and the calculated average pixel output value;
a storage circuit to store the offset values; and
an adding circuit configured to combine each offset value with a corresponding pixel output of a pixel in the imager row.

15. The noise-reducing circuit of claim 14, wherein said circuit is configured to repeat the steps of identifying, determining, finding and re-setting until there are no pixel output values that differ in value from the reference average pixel output value by the predetermined threshold amount.

16. The imager of claim 14, wherein the offset values are generated and the average pixel output value is calculated using parallel input arithmetic mean modules.

17. The imager of claim 14, wherein the plurality of pixel output values are associated with n pixels in an imager row of N pixels, and the pixel value correction circuit, the column-wise offset calibration module, the storage circuit and the adding circuit are applied to each of a plurality of groups of n pixels in the imager row.

18. The imager of claim 14, wherein said noise-reducing circuit further comprises a row-wise offset calibration module for determining an additional offset value for the plurality of pixel outputs by finding an average pixel output for a plurality of optically black pixels in the imager row.

19. The imager of claim 18, wherein the row-wise offset calibration module is further configured to compute an initial average pixel output value for the plurality of pixel output values, to set a reference average pixel output value to the initial average pixel output value, to identify pixel output values that differ in value from the reference average pixel output value by a predetermined threshold amount, and to determine a new reference average pixel output value after replacing the identified pixel output values with the prior reference average pixel output value.

20. The imager of claim 19, wherein the row-wise offset calibration module is further configured to find whether the new average pixel output value is equal to the prior reference average pixel output value, to re-set the prior reference average pixel output value to the new average pixel output value, and to repeat the steps of identifying, determining, finding and re-setting until a newly determined average pixel output value is equal to a prior reference average pixel output value.

21. The imager of claim 20, wherein the row-wise offset calibration module is configured to repeat the steps of identifying, determining, finding and re-setting until there are no pixel output values that differ in value from the reference average pixel output value by the predetermined threshold amount.

22. An imaging system, comprising:
an imager, said imager comprising:
a noise-reducing circuit, said noise-reducing circuit comprising:
a pixel value correction circuit configured to calculate an average pixel output value for a plurality of pixel output values associated with a corresponding plurality of pixel columns in an imager row;
a column-wise offset calibration module configured to generate an offset value for each of the plurality of pixel outputs by computing the difference between each of the plurality of pixel outputs and the calculated average pixel output value;
a storage circuit for storing the offset values; and
an adding circuit configured to combine each offset value with a corresponding pixel output of a pixel in the imager row.

23. The imaging system of claim 22, wherein the offset values are generated and the average pixel output value is calculated using parallel input arithmetic mean modules.

24. The imaging system of claim 22, wherein the plurality of pixel output values are associated with n pixels in an imager row of N pixels, and the pixel value correction circuit, the column-wise offset calibration module, the storage circuit and the adding circuit are applied to each of a plurality of groups of n pixels in the imager row.

25. The imager of claim 22, wherein said noise-reducing circuit further comprises a row-wise offset calibration module for determining an additional offset value for the plurality of pixel outputs by finding an average pixel output for a plurality of optically black pixels in the imager row.

26. The imaging system of claim 25, wherein the row-wise offset calibration module is further configured to compute an initial average pixel output value for the plurality of pixel output values, to set a reference average pixel output value to the initial average pixel output value, to identify pixel output values that differ in value from the reference average pixel output value by a predetermined threshold amount, and to determine a new reference average pixel output value after replacing the identified pixel output values with the prior reference average pixel output value.

27. The imaging system of claim 26, wherein the row-wise offset calibration module is further configured to find whether the new average pixel output value is equal to the prior reference average pixel output value, to re-set the prior reference average pixel output value to the new average pixel output value, and to repeat the steps of identifying, determining, finding and re-setting until a newly determined average pixel output value is equal to a prior reference average pixel output value.

28. The imaging system of claim 27, wherein the row-wise offset calibration module is configured to repeat the steps of identifying, determining, finding and re-setting until there are no pixel output values that differ in value from the reference average pixel output value by the predetermined threshold amount.

* * * * *